United States Patent [19]

Dittrich et al.

[11] Patent Number: 5,593,146

[45] Date of Patent: Jan. 14, 1997

[54] HYDRAULICALLY ACTUATED BAR-LIKE CLAMPING TOOL

[75] Inventors: Gerhard Dittrich, Plön; Marius Beben, Eutin; Wolfgang Mehlert, Röbel, all of Germany

[73] Assignee: Kuhnke GmbH, Malente, Germany

[21] Appl. No.: 341,557

[22] PCT Filed: Mar. 19, 1994

[86] PCT No.: PCT/DE94/00318

§ 371 Date: Feb. 27, 1995

§ 102(e) Date: Feb. 27, 1995

[87] PCT Pub. No.: WO94/22638

PCT Pub. Date: Oct. 13, 1994

[30] Foreign Application Priority Data

Mar. 26, 1993 [DE] Germany .............. 9304652 U

[51] Int. Cl.$^6$ .................................. B25B 11/00
[52] U.S. Cl. ................ 269/22; 269/20; 254/93 HP
[58] Field of Search .................. 269/22, 20, 266, 269/25; 254/93 HP; 92/90, 92, 93, 94, 96, 103 F, 104, 35

[56] References Cited

U.S. PATENT DOCUMENTS 3,010,698  11/1961  Allen et al. .
3,048,386   8/1962  Thumim ......................... 269/22
3,924,843  12/1975  Hirmann ..................... 254/93 HP
4,687,189   8/1987  Stoll et al. .................... 269/22

FOREIGN PATENT DOCUMENTS 2392261  12/1978  France .
2229821   2/1973  Germany .
 495271  11/1975  U.S.S.R. .

*Primary Examiner*—Robert C. Watson
*Attorney, Agent, or Firm*—Panitch Schwarze Jacobs & Nadel, P.C.

[57] ABSTRACT

The invention relates to a hydraulically actuated bar-like clamping tool with an elongated base body (1), a reciprocating elongated clamping body (2) and a tubular inflatable body (18) arranged between both said bodies for moving the clamping body. The inflatable body is secured in a fluid-tight manner at one end and is connected to a fluid connection at its other end. The base body (1) and the clamping body (2) consist each of a U-shaped section with meshing legs (9;10). A reciprocating, elongated thrust piece (15) supported on the ends of the legs of the clamping body (2) and a fixed, elongated abutment (13) are arranged between the legs (9) of the base body (1). The tubular inflatable body (18) extends on the one hand between the base body (1) and the pressure member (15) and after it is deflected it extends on the other hand between the abutment (13) and the clamping body (2). The U-shaped base body (1) has a close-off arrangement (3) at least at its end provided with the fluid connection (3a).

6 Claims, 1 Drawing Sheet

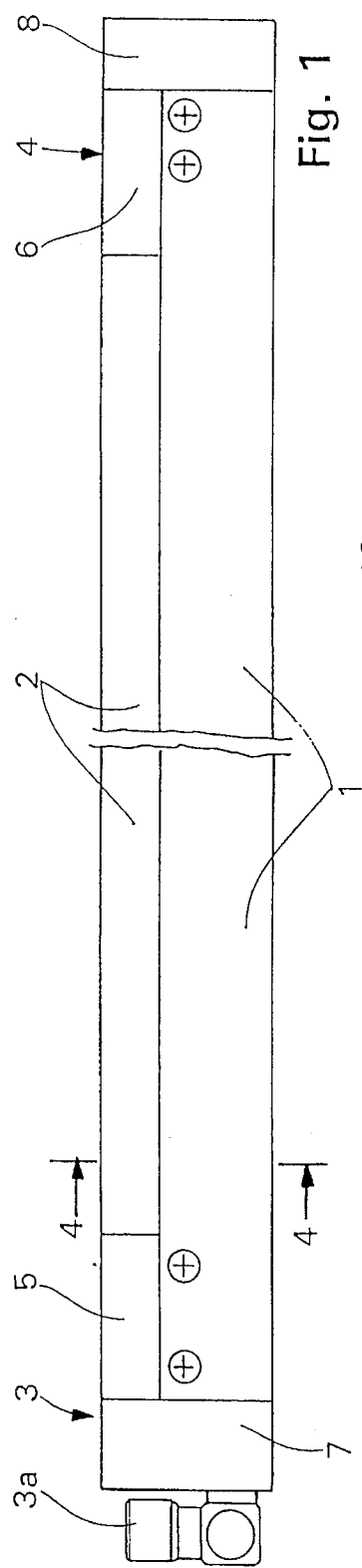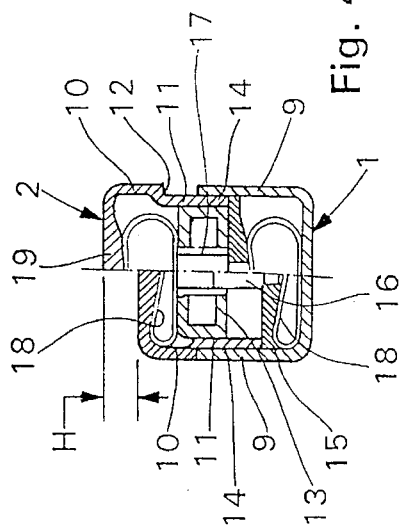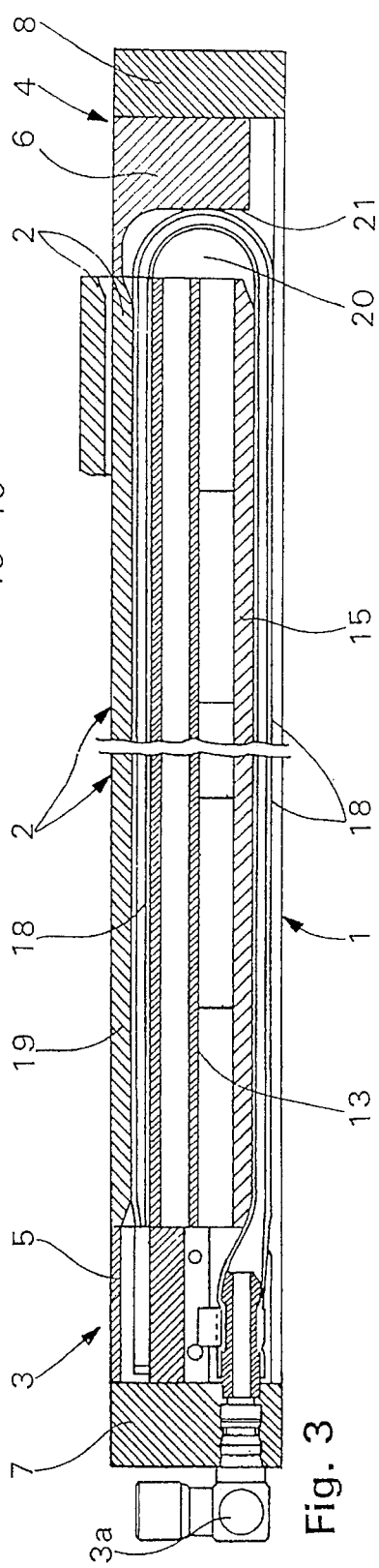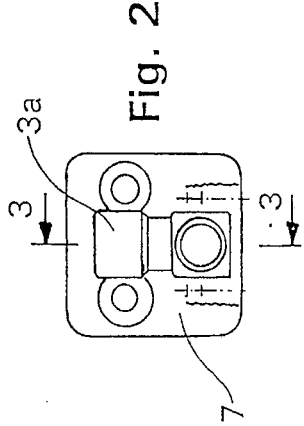

HYDRAULICALLY ACTUATED BAR-LIKE CLAMPING TOOL

FIELD OF THE INVENTION

The invention pertains to a hydraulically operated, bar-like clamping tool with an elongated base body, and elongated clamping body that can be moved in reciprocating fashion to the base body, and arranged between these two bodies a tubular inflatable body for moving the clamping body, wherein the inflatable body is secured in a fluid-tight manner at one end and is connected at its other end to a fluid connection

BACKGROUND OF THE INVENTION

A clamping tool of that type is known from the FR disclosure document 2 125 216. It consists of an elongated base plate on which an elongated, straight tube section lies, which is secured at both of its ends and at both ends of the base plate by means of plate-shaped crosspieces and screws. The tube section is provided on its upper side with an elongated clamping body, which comes to rest against a workpiece. The tube section exhibits a fluid connection at its one end. When the tube section is inflated, the clamping body lifts and presses against the workpiece that is to be lifted, for example. Only a limited lifting force can be generated with this tool, and in addition, the tool is a relatively large tool in relation to the size of the force it deploys.

In addition, there is described in another FR disclosure document 2 220 701 a clamping tool with which, by means of a tubular inflatable body, a plate-shaped clamping body is forced away from a base body that is likewise plate-shaped, so that the clamping body comes to rest against a workpiece and the latter is restrained in this way. In order to generate an increased clamping force, the tool is configured in such a way that the base body exhibits several reinforcing ribs that are parallel to each other and the clamping body exhibits several pressure ribs that are parallel to each other, whereby the ribs of both bodies mesh together in a comb-like fashion. In conjunction with this, the tubular inflatable body is guided between the ribs of both bodies in a serpentine fashion in such a way that when it is provided with hydraulic fluid, it presses the clamping body away from the base body. The multiple serpentine segments of the inflatable body deploy a correspondingly multiplied force deployment, and transmit this force to the clamping body. Since this tool is supposed to deploy unusually high forces, because it is used for vise purposes, by way of example, it is also of a voluminous size and accordingly needs a correspondingly large set-up location, and is, as a result of its complicated form, burdened with corresponding manufacturing costs.

SUMMARY OF THE INVENTION

The task of the invention therefore consists in improving a hydraulically operated, bar-like clamping tool of the type described by way of introduction in such a way that it can deploy the greatest possible clamping forces in relation to its relatively small volume dimensions, and is also simply designed and able to be manufactured at reasonable cost.

The solution to this task starts from the hydraulically operated, bar-like clamping tool of the type described by way of introduction, and is further characterized by the fact that the base body and the clamping body each consists of a U-shaped section with legs that mesh with each other, that in the base body between its legs there are provided an elongated, reciprocating thrust piece that is adjacent to the ends of the legs of the clamping body and a fixed, elongated abutment, that the tubular inflatable body extends on the one hand between the base body and the thrust piece and, after it is deflected, between the abutment and the clamping body on the other hand, and that the U-shaped base body exhibits a shutting off arrangement at least at its end that exhibits the fluid connection.

By means of this solution, a clamping tool is created in the form of a tensioning bar that is compact in design and can deploy a very large clamping force relative to its size. In addition, the tool can be produced using few and simple components, so that it can also be produced at a reasonable cost. The large deployment of force even with a clamping bar of this type can be explained on the basis of the long, tubular inflatable body, which, after its deflection of 180°, in essence extends back over the length of the tensioning bar again, so that a doubled force is exerted by the hydraulically activated inflatable body upon the clamping body. In addition to that, the clamping tool in accordance with the invention can, because of its bar-like form, be used in many ways. Finally, that also forms the basis for the fact that, externally, the tool exhibits no unnecessary corners and edges in its cross-section, because the meshing U-shaped bodies practically form a square or rectangular shape.

In an advantageous further development of the clamping tool in accordance with the invention, the abutment is configured as a transverse wall that extends over the length of the clamping body and parallel to the base body, and between the two long side edges of the transverse wall and the two legs of the base body that lie opposite these edges, there is formed one slot each for guiding the legs of the clamping body. In conjunction with this, it is advantageous if the thrust piece exhibits at least one guiding pin, which slides in a guiding hole in the transverse wall. As a result of this configuration, the thrust piece and the clamping body carry out a secure reciprocating movement, and the inflatable body can deploy its full inflation force.

BRIEF DESCRIPTION OF THE DRAWINGS

The invention is described in more detail in the following with the aid of an implementation example that is shown in the drawing. Shown are:

FIG. 1 is a side view of the implementation example,

FIG. 2 is an end view of the example according to FIG. 1,

FIG. 3 is a longitudinal section according to the line A—A in FIG. 2, and

FIG. 4 is a cross-section according to the line B—B in FIG. 1, with the basic position of the clamping body shown once and the lift position shown separately.

DETAILED DESCRIPTION OF PREFERRED EMBODIMENT

In accordance with FIGS. 1 and 4, the implementation example primarily consists of an elongated base body 1 in the form of a U-shaped section, a clamping body 2, likewise in the form of a U-shaped section, whereby the clamping body is, however, shorter than the base body, and two close-off arrangements 3 and 4 that are provided at the ends of the base body and with which the base bodies 1 and 2 are shut off to the outside, in conjunction with which the one close-off arrangement 3 exhibits a fluid connection 3a. Each of the shutting off arrangements 3, 4 consists of an insert piece 5 or 6 onto which the base body 1 is screwed, and of a close-off cover 7 or 8, which is in turn screwed onto the insert piece in question. Even though it is advantageous to provide two close-off arrangements, one can also proceed in such a way that only close-off arrangement 7 is provided with the fluid connection 3a. As can be seen especially clearly in FIG. 4, the legs of the base body 1 and the clamping body 2 mesh with each other, so that the clamping tool forms an elegant clamping bar that represents a square or rectangular shape in its cross-section.

While the base body 1 exhibits a simple U-shape in its cross-section, so that its legs 9 run in a straight line, the legs 10 of the clamping body 2 exhibit a set-back meshing section 11 in conjunction with which these set-back meshing sections 11 slide along inside at the legs 9 of the base body 1. Each of the legs 10 of the clamping base 2 exhibits a stopping shoulder 12, which comes to rest against the free end of the leg 9 of the base body 1, by means of which the starting position of the clamping body 2 is determined.

Inside the base body 1, an elongated abutment 13 is provided which is placed in a fixed fashion with respect to the base body 1, for example, by means of the fact that it is mounted on the insert piece 5 of the close-off arrangement 3, and that it extends over the length of the clamping body 1, as can be clearly seen in FIG. 3. In addition, the abutment extends parallel to the bodies 1 and 2, and is provided approximately in the region of the ends of the leg 9 of the base body 1 in order to create sufficient space for an arrangement for actuating the clamping body 1 (FIG. 4). The abutment 13 is configured as an elongated transverse wall, and specifically of a type such that between its two long side edges and the end regions of the leg 9 of the base body 1 slots 14 are formed, each of which exhibits a width that corresponds to the thickness of the meshing section 11 of the leg 12 of the clamping body 2. In this way the clamping body 2 is guided securely in its reciprocating movement. In addition, there is provided underneath the abutment and the transverse wall 13, a loose thrust piece 15, which likewise extends over the length of the clamping body 2 and transmits a force, which is exerted upon the thrust piece, to the ends of the legs 12 of the clamping body 2, as can be seen in FIG. 4. In order to protect the thrust piece 15, for example, from movement in its longitudinal direction, it can be provided with at least one guiding pin 16, which slides freely in a guide hole 17 of the transverse wall 13.

In addition, there is provided a tubular inflatable body 18 which first extends from the shutting off arrangement 3 with the fluid connection 3a underneath the thrust piece 15 to the other end region of the bodies 1 and 2, and then, deflecting by 180°, extends back again to the close-off arrangement 3, and specifically, in a space above the abutment 13 and below the web 19 of the clamping body 2. The inflatable body 18 thus lies at the thrust piece 15, and at the clamping body 2. If the inflatable body is actuated by hydraulic fluid via the connection 3a, both the thrust piece 15 as well as the web 19 of the clamping body 2, are provided with a force of pressure as a result, in conjunction with which the thrust piece likewise transmits its force to the clamping body. The clamping body is thus acted upon by a doubled force. The reciprocation path H of the clamping body 2 is limited by the presence of the thrust piece 15 against the underside of the abutment 13. In the region of the deflection of the tubular inflatable body 18, a space 20 is provided that compensates for the expansion changes of the inflatable body. In order to ensure a secure flow of hydraulic fluid into the return section of the inflatable body, the insert piece 6 can exhibit a contact surface 21 that prevents any kinking of the inflatable body at its deflection location.

The functioning of the described implementation example becomes clear to the professional from the preceding description and from the drawn figures. In this regard, FIG. 3 shows, in a partial representation by way of indication, the lifted position of the clamping body 2, which represents its working position.

We claim:

1. Hydraulically operated, bar clamping tool with an elongated base body (1) having first and second ends, an elongated clamping body (2) attached to the base body for reciprocating movement relative to the base body, and a tubular inflatable body arranged between the base body and the clamping body for moving the clamping body, the inflatable body (18) having first and second ends, the first end of the inflatable body being secured in a fluid-tight manner and the second end of the inflatable body being connected to a fluid connection, the base body (1) and the clamping body (2) each comprising a U-shaped section with two legs (9; 10) that mesh with each other, an elongated reciprocating thrust piece (15) being located between the legs (9) of the base body (1) adjacent to the legs of the clamping body (2), a fixed, elongated abutment (13) located in a fixed position in the base body (1) between the legs (9) of the base body, the tubular inflatable body (18) having a first portion which extends between the base body (1) and the thrust piece (15) and a second portion, which extends parallel and adjacent to the first portion between the abutment (13) and the clamping body (2), the first and second portions of the inflatable body being joined in a deflection region, and a close-off member (3) located at least at one of the first and second ends of the base body that includes the fluid connection (3a).

2. Clamping tool in accordance with claim 1, characterized by the fact that the abutment (13) is configured as a transverse wall that extends over the length of the clamping body (2) and parallel to the base body (1), the transverse wall having two long side edges, and that between each of the two long side edges of the transverse wall and the two legs (9) of the base body (1) that lie opposite these edges, there is formed a slot (14) for guiding the legs (12) of the clamping body (1).

3. Clamping tool in accordance with claim 2, characterized by the fact that the thrust piece (15) comprises at least one guiding pin (16), and at least one guiding hole is provided in the transverse wall in a complementary position to the at least one guiding pin, such that the at least one guiding pin slides in the at least one guiding hole (17) in the transverse wall (13).

4. Clamping tool in accordance with claim 1 wherein two close-off members (3,4) are provided, with one close-off member being located on each end of the base body, each of the two close-off members (3, 4) of the base body (1) comprises an insert piece (5, 6) attached to the base body and a cover (7, 8) that is connected to each insert piece.

5. Clamping tool in accordance with claim 1, characterized by the fact that the legs (12) of the U-shaped clamping body (2) that mesh into the U-shaped base body (1) along a meshing section (11) each include a set-back, and that each set-back has a stopping shoulder (12), which comes to rest against a free end of the leg (9) of the base body (1).

6. Clamping tool in accordance with claim 4, characterized by the fact that the close-off member (4) located in the deflection region between the first and second portions of the inflatable body (18) comprises a contact surface (21) for deflecting the inflatable body.

* * * * *